US009342899B2

(12) United States Patent
Gao et al.

(10) Patent No.: US 9,342,899 B2
(45) Date of Patent: May 17, 2016

(54) METHOD FOR MEASURING MICROPHYSICAL CHARACTERISTICS OF NATURAL PRECIPITATION USING PARTICLE IMAGE VELOCIMETRY

(71) Applicant: PLA University of Science and Technology, Nanjing, Jiangsu (CN)

(72) Inventors: Taichang Gao, Jiangsu (CN); Xichuan Liu, Jiangsu (CN); Lei Liu, Jiangsu (CN); Shijun Zhao, Jiangsu (CN); Dongli Zhai, Jiangsu (CN)

(73) Assignee: PLA UNIVERSITY OF SCIENCE AND TECHNOLOGY, Nanjing, Jiangsu (CN)

( * ) Notice: Subject to any disclaimer, the term of this patent is extended or adjusted under 35 U.S.C. 154(b) by 300 days.

(21) Appl. No.: 14/170,888

(22) Filed: Feb. 3, 2014

(65) Prior Publication Data
US 2015/0035944 A1 Feb. 5, 2015

(30) Foreign Application Priority Data

Jul. 31, 2013 (CN) .......................... 2013 1 0330498

(51) Int. Cl.
| H04N 15/00 | (2006.01) |
| H04N 7/12 | (2006.01) |
| H04N 11/02 | (2006.01) |
| H04N 11/04 | (2006.01) |
| G06T 7/60 | (2006.01) |
| G06K 9/40 | (2006.01) |
| H04N 5/372 | (2011.01) |
| H04N 5/225 | (2006.01) |
| H04N 5/235 | (2006.01) |
| H04N 5/353 | (2011.01) |

(52) U.S. Cl.
CPC ... *G06T 7/60* (2013.01); *G06K 9/40* (2013.01); *G06T 7/602* (2013.01); *H04N 5/2256* (2013.01); *H04N 5/2353* (2013.01); *H04N 5/2354* (2013.01); *H04N 5/353* (2013.01); *H04N 5/372* (2013.01); *G06T 2207/10028* (2013.01); *G06T 2207/20032* (2013.01); *G06T 2207/30192* (2013.01)

(58) Field of Classification Search
None
See application file for complete search history.

(56) References Cited

U.S. PATENT DOCUMENTS

| 3,943,762 | A | 3/1976 | Baer |
| 4,613,938 | A | 9/1986 | Hansen et al. |
| 4,754,149 | A | 6/1988 | Wang |
| 5,298,750 | A | 3/1994 | Rericha |
| 5,528,224 | A | 6/1996 | Wang |
| 6,038,920 | A | 3/2000 | Gilbert |
| 6,914,674 | B1 | 7/2005 | Wang |
| 7,249,502 | B2 | 7/2007 | Luukkala et al. |
| 2002/0159060 | A1* | 10/2002 | Roques .............. G01N 15/0227 356/335 |
| 2007/0103359 | A1* | 5/2007 | Testud ................... G01S 13/95 342/26 R |
| 2008/0068386 | A1* | 3/2008 | Lin ......................... G06T 13/60 345/473 |
| 2009/0298685 | A1* | 12/2009 | Torii ....................... A61L 15/18 502/402 |
| 2013/0258092 | A1* | 10/2013 | Hallset .................. B08B 9/0321 348/81 |

* cited by examiner

Primary Examiner — Frederick Bailey
Assistant Examiner — Talha M Nawaz
(74) Attorney, Agent, or Firm — Global IP Services; Tianhua Gu

(57) ABSTRACT

A method and video sensor for precipitation microphysical features measurement based on particle image velocimetry. The CCD camera is placed facing towards the light source, which forms a three-dimensional sampling space. As the precipitation particles fall through the sampling space, double-exposure images of precipitation particles illuminated by pulse light source are recorded by CCD camera. Combined with the telecentric imaging system, the time between the two exposures are adaptive and can be adjusted according to the velocity of precipitation particles. The size and shape can be obtained by the images of particles; the fall velocity can be calculated by particle displacement in the double-exposure image and interval time; the drop size distribution and velocity distribution, precipitation intensity, and accumulated precipitation amount can be calculated by time integration. This invention provides a method for measuring the shape, size, velocity, and other microphysical characteristics of various precipitation particles.

12 Claims, 2 Drawing Sheets

METHOD FOR MEASURING MICROPHYSICAL CHARACTERISTICS OF NATURAL PRECIPITATION USING PARTICLE IMAGE VELOCIMETRY

CROSS REFERENCE TO RELATED PATENT APPLICATION

The present application claims the priority of the Chinese patent application No. 2013103304983 filed on Jul. 31, 2013, which application is incorporated herein by reference.

BACKGROUND OF THE INVENTION

1. Field of the Invention

The present invention discloses a method for measuring microphysical characteristics of natural precipitation using particle image velocimetry, which measures the shape, size, fall velocity, and other physical characteristics of the precipitation particles. The present invention relates to the field of automated weather systems.

2. Description of Prior Art

The detailed knowledge on precipitation microstructures, such as size, shape, fall velocity, and phase of precipitation particles, are crucial to the precipitation remote sensing, terrestrial and satellite radio transmission, tropospheric wave propagation, soil erosion, and other atmospheric sciences and applications.

A number of tools were invented to measure the intensity, and amount of precipitation. At first, the amount of precipitation was recorded by collecting the precipitation in graduated cylinder manually. U.S. Pat. No. 3,943,762 (1976) discloses a tipping bucket rain gauge, which utilizes two oscillating reservoirs to collect rainwater and measure the rate and amount of rain automatically, but it can underestimate the rain intensity of a blowing rainfall and the duration of a light rainfall. According to the system disclosed in U.S. Pat. No. 6,038,920 (2000), a precipitation measuring system is used for electronically measuring the amounts of rain, snow, hail or the like, with the use of a load cell as a weight sensor. These instruments are now widely used as operational instruments, but they are not able to measure the microphysical features of precipitation.

Present weather observing system (U.S. Pat. No. 4,613,938, 1986) includes a radiation source and detector which can detect the scattered radiation from suspended or precipitating particles within a sample volume, it can obtain the intensity and types of precipitation. An optical precipitation gauge (U.S. Pat. No. 4,754,149, 1988) employs an optical transmitter and receiver to detect scintillations produced by particle movement in the light beam. A laser precipitation sensor (U.S. Pat. No. 5,298,750, 1994) can identify and record the precipitation type, size and intensity by detecting the beam of laser light scattered by particles. An optical and acoustic weather identification system (U.S. Pat. No. 5,528,224, 1996) employs a light beam source that transmits a partial coherent beam to detect precipitation, and distinguish snow, sleet, and hail from rain by an acoustic receiver. A weather identifier system (U.S. Pat. No. 6,914,674, 2005) employs two photo-sensitive receivers to detect the scintillation and forward scattering of light from a partially coherent light beam source, which can identify the rain, snow, and drizzle.

According to the system disclosed in U.S. Pat. No. 7,249,502, an impact disdrometer infers the size of the individual drops from the measured impact kinetic of the drops through an empirical nonlinear relationship between fall velocity and drop diameter in still air, but it cannot measure the shape and velocity of raindrops. OTT PARSIVEL disdrometer can measure the horizontal size of particles using the decrease of light signal by extinction; the vertical size and fall velocity of particles are estimated by the empirical assumption of raindrops' shape, but the difference between assumption and real rainfall can cause distortion of drop size distribution and velocity distribution. Also, this device cannot measure the particles' shape.

Both the 2D Video Disdrometer (2DVD) and Hydrometeor Velocity Size Disdrometer (HVSD) have two line-scan cameras; therefore the vertical velocity of each particle can be determined according to the distance between the two light sheets and its traveling time. 2DVD can measure three-dimensional raindrop shape information, while HVSD can only measure two-dimensional raindrop shape information. Since the raindrop image is acquired in sequential planar sections as it falls through the light sheet, the horizontal motion of the droplet in the presence of horizontal winds causes a distorted image of the raindrops. While such distortion may be corrected, errors in the drop shape measurement are inevitable. Snow Video Imager (SVI) can measure the shapes and size distributions of snowflakes using a CCD image sensor illuminated by a halogen flood lamp, but it cannot measure the fall velocity of snowflakes/raindrops.

Accordingly, there remains the need for measuring the size, shape, fall velocity of precipitation particles simultaneously.

SUMMARY OF THE INVENTION

The object of the present invention is to provide a method and video sensor for precipitation microphysical features measurement based on particle image velocimetry, which can measure the shape, size, velocity, phase of precipitation particles simultaneously. The sensor preferably includes a CCD camera, a pulse light source, and a digital signal processor.

Particularly, the present invention provides a method for measuring the precipitation particles comprising:

a. The CCD camera is placed facing towards the light source, which forms a three-dimensional sampling space.

b. Synchronized by a microprocessor, the shutter and the light source take double exposure of the precipitation particle on one frame, and the auto-correlation images of the precipitation particles are recorded by CCD camera c. The horizontal and vertical dimensions of particles are inferred from the images based on the scaling relation between the images and the size.

d. The shape, axis ratio, as well as orientation of particles are calculated by the image processing algorithm using gray-scale mapping and binarization.

e. The vertical and horizontal velocities of particles are calculated according to the particle displacement in double-exposure image and interval time.

f. The phase of precipitation particles are classified according to the shape of particles, and the relationship between the velocity and size of particles.

g. The spectral distribution, precipitation intensity, and accumulated precipitation amount are calculated by time integration.

The CCD camera takes images of precipitation particles with 50±25 frame per second. The CCD camera and pulse light source are synchronized by a microprocessor, by which each particle is exposed twice in each frame. Each exposure time is no more than 10 μs, which can avoid overexposure or streak of imaging.

The time between two exposures are adaptive and is adjusted according to the velocity of different particles (1 ms~3 ms), so that the two exposures of the same particle can be recorded in one image.

During the real-time measurement, the empty three-dimensional sampling space is recorded as the background of the imaging system. The background image is subtracted from the raw image and the difference image with flat background and clear particles is obtained. Non-precipitation images can be identified and eliminated by time series analysis of sequential frames. If the images of the same size are detected in the same position in several sequential frame images, they are eliminated as noises, water spots on lens or other non-precipitation images.

The raw images with fuzzy edges and noise are restored using the median filtering and point spread function. The shape, size, axis ratio, orientation of particles are obtained using the images feature extraction method based on the gray scale and contour features. The fall velocity of particles are calculated from auto-correlation images using the particle gray scale tracking method. The spectral distribution, precipitation intensity, and accumulated precipitation amount can be calculated by time integration.

The present invention describes a method for measuring the microphysical characteristics of precipitation based on particle image velocimetry which can measure the shape, size, and velocity of precipitation particles in natural environment simultaneously using only one planar array CCD sensor, which can address the disadvantages of linear scan CCD disdrometer and impact disdrometer.

BRIEF DESCRIPTION OF THE DRAWINGS

Various objects, features, and advantages of the present invention can be fully appreciated with reference to the following detailed description of the invention when considered in connection with the following drawings, in which like reference numerals identify like elements.

DETAILED DESCRIPTION OF THE EMBODIMENTS OF THE INVENTION

Figure 1:
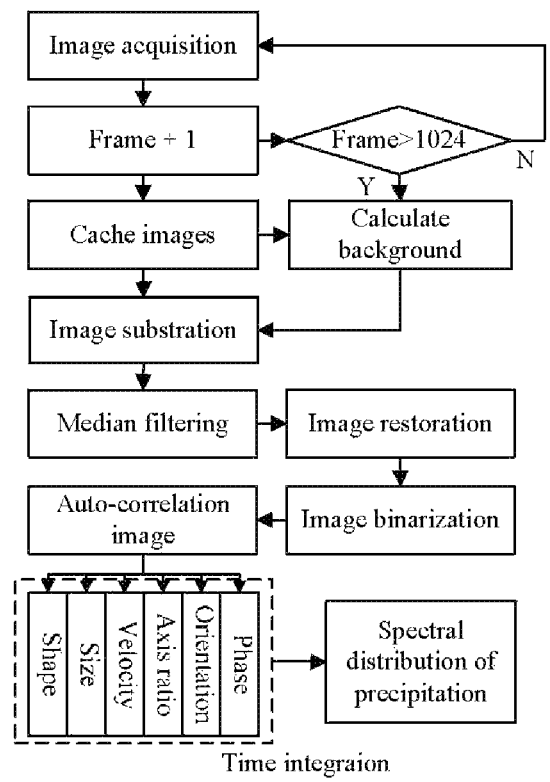
FIG. 1 is a flowchart of the process of data acquisition and feature extraction.
Figure 2:
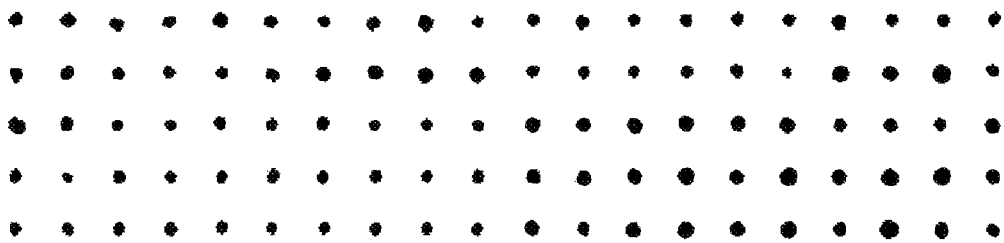
FIG. 2 is a graphical representation of the raindrops' images.
Figure 3:
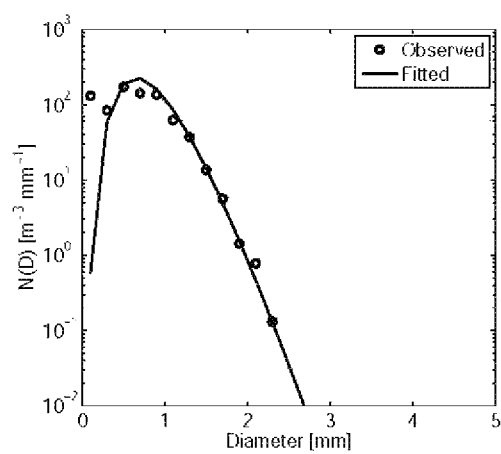
FIG. 3 is a graphical representation of raindrop size distribution.
Figure 4:
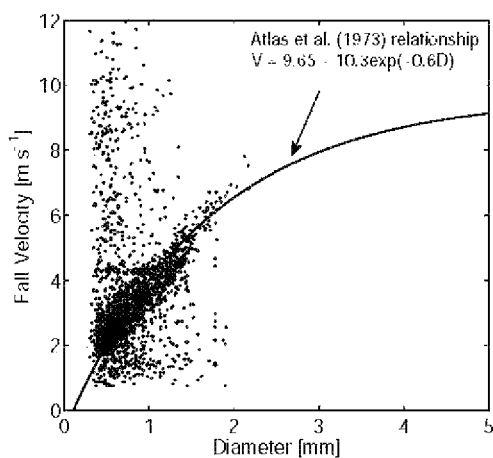
FIG. 4 is a graphical representation of raindrop velocity distribution.
Figure 5:
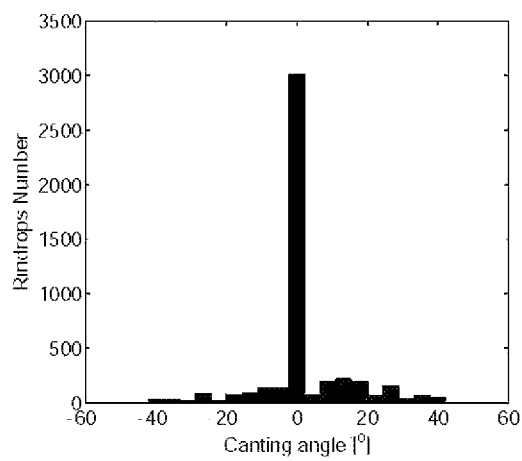
FIG. 5 is a graphical representation of raindrop orientation distribution.

The present invention described herein is directed to a method for measuring the microphysical characteristics of precipitation based on the particle image velocimetry techniques. The sensor preferably includes a CCD camera, a pulse parallel light source, and a digital signal processor. The auto-correlation images of particles can be obtained by the adaptive double-exposure in one frame, by which the microphysical features of precipitation can be measured in real time. The microphysical characteristics of precipitation include shape, size, velocity, axis ratio, orientation, and phase of raindrops, snowflakes, hailstone, and etc., based on which the precipitation types can be identified.

The telecentric afocal imaging system is designed to address the depth of field in the images. The chief ray is parallel to the axis in object space and image space, and both the EP and the XP are located at infinity, which ensures that the image size does not change with focus position. The centered lens are used to generate the parallel light beam, and the divergence is less than 0.2 mrad.

The adaptive feature in the single-frame, double-exposure imaging means that the time between two exposures is adaptive and can be adjusted according to the velocity of different particles (1 ms~3 ms), so that the two exposures of the same particle can be recorded in one image. The exposure interval of snowflakes is longer than that of raindrops.

The raw images with fuzzy edge and noises are restored using the median filtering and point spread function; the precipitation type can be identified based on the shape, size—velocity, axis ratio, rectangularity, number of angular point.

In one embodiment of the present invention, the microphysical characteristics of precipitation particles are obtained using the following steps:

1) Several sequential frames (for instance 1024 frames) of images are averaged and taken as the background. The background image is subtracted from the raw image and the difference image with flat background and clear particles is obtained. The background images can be updated in real-time.

2) When the precipitation particles pass through the sampling area, double-exposure images of particles can be recorded by CCD/CMOS camera, the auto-correlation images can be obtained by subtracting the background image from the raw images.

3) Non-precipitation images are identified and eliminated by time series analysis of sequential frames. If the images of the same size are detected in the same position in several sequential frame images, they are eliminated as noises, water spots on lens or other non-precipitation images.

4) The image processing algorithm includes:

a. Filter denoising: the noises in raw images are eliminated by median filtering.

b. Image restoration: the raw images with fuzzy edge are restored using the point spread function.

The image degradation model is:

$$g(x,y)=f(x,y)*h(x,y)+n(x,y) \tag{1}$$

where g(x, y) is the blur image, f(x, y) is the ideal image, n(x, y) is the additive noise, h(i, j) is the point spread function, which is defined as:

$$h(i,j) = \begin{cases} 1/(\pi R^2) & \sqrt{i^2+j^2} \leq R \\ 0 & \sqrt{i^2+j^2} > R \end{cases} \tag{2}$$

where the R is the defocusing radius, x, y, i, j are the coordinates of pixels in images.

c. Image binarization and edge detection: the binarization images of particles are obtained by a global threshold value based on the grayscale histogram, and the edges of particles are detected using the binarization threshold. Each pixel larger than the specific threshold value is marked as 1, which denotes the effective object; other pixels are marked as 0, which denotes the backgrounds.

5) The microphysical characteristics are extracted using the following algorithms:

Area: the summation of pixels with grayscale values that are larger than the threshold.

$$A_R = \sum_{(x,y)\in R} 1 \qquad (3)$$

Perimeter: the summation of pixel values on the contour of particle's image.

$$P_R = \sum_{(x,y)\in C} 1 \qquad (4)$$

Long axis: the long axis of minimum enclosing rectangle of particle's image.

$$E_A = \max_{p_i, p_j \in C} \lfloor D(p_i, p_j) \rfloor \qquad (5)$$

Short axis: the short axis of minimum enclosing rectangle of particle's image.

$$E_B = \max_{p_i, p_j \in C, p_i, p_j \perp E_A} \lfloor D(p_i, p_j) \rfloor \qquad (6)$$

Equivolumetric diameter: the diameter of spherical particle with the same volume of non-spherical particle.

$$D_{eq} = \left(\frac{6V}{\pi}\right)^{-1/3} = (E_A^2 E_B)^{-1/3} \qquad (7)$$

Axis ratio: the ratio of short axis and the long axis of particle.

$$\alpha = \frac{E_B}{E_A} \qquad (8)$$

Canting angle: the angle between the symmetry axis and vertical direction.

$$\theta = \angle \vec{E_B}/\vec{\text{Vertical}} \qquad (9)$$

Velocity: the moving velocity of particles in horizontal direction and vertical direction.

$$\begin{cases} v_x = \frac{\Delta x}{\Delta t} = \frac{x_2 - x_1}{\Delta t} \\ v_y = \frac{\Delta y}{\Delta t} = \frac{y_2 - y_1}{\Delta t} \end{cases} \qquad (10)$$

6) The spectral distribution of precipitation particles can be obtained based on the capture probability. The probability of a certain particle with a certain size and fall velocity can be captured by the CCD camera is defined as $$Prob(D) = \frac{H - D_V - V(D) \cdot T_{interval}}{V(D) \cdot T_{frame}} \qquad (11)$$

where H is the height of sampling size, $D_V$ is the vertical size of drops, V(D) is the vertical velocity of drops, $T_{interval}$ is the exposure interval in each frame, $T_{frame}$ is the exposure time of each frame.

The raindrop size distribution N(D) can be computed as follows:

$$N(D) = \frac{Num(D)}{Vol \cdot dD \cdot Prob(D)} \qquad (12)$$

where N(D) is the sampled number concentration of particles per volume per size ($m^{-3}$ $mm^{-1}$); Num(D) is the number of particles of each bin, which can be obtained by counting particles and summing volume increments during the time interval; Vol is the effective sampling volume; dD is the interval size of particle.

What is claimed is:

1. A method for measuring microphysical characteristics of precipitation particles using particle image velocimetry comprising following steps:
   a. a CCD camera is placed facing towards the light source, which forms a three-dimensional sampling space;
   b. auto-correlation images of precipitation particles illuminated by pulse light source are recorded by CCD camera;
   c. horizontal and vertical dimensions of particles are inferred from the images based on the scaling relation between the images and the size;
   d. shape, axis ratio, as well as orientation of particles are calculated by the image processing algorithm;
   e. vertical and horizontal velocities of particles are calculated according to the particle displacement in double-exposure image and interval time;
   f. phases of precipitation particles are classified according to the shape of particles, and the relationship between the velocity and size of particles;
   wherein the defocused and noisy images are restored using the median filtering and point spread function, the shape, size, axis ratio, orientation of particles are calculated based on grayscale and contour of images, and the fall velocity of particles are calculated from auto-correlation images using the particle grayscale tracking method.

2. The method according to claim 1, wherein the CCD camera takes images of precipitation particles with a frame frequency of 50±25 frame per second.

3. The method according to claim 1, wherein the CCD camera and pulse light source are synchronized by a microprocessor and take a double-exposure of each precipitation particle on one frame, where each exposure time is no more than 10 μs.

4. The method according to claim 3, wherein the time between two exposures are adaptive and can be adjusted according to the velocities of different particles with scales of 1 ms~3 ms, so that the two exposures of the same particle can be recorded in one image.

5. The method according to claim 1, wherein the spectral distribution of shape, velocity, size, axis ratio, orientation, and phase of precipitation particles are obtained by time integration.

6. The method according to claim 1, wherein the background of imaging system is detected real-time using the three-dimensional sampling space, and the background image is subtracted from the raw image to obtain a difference image with flat background and clear particles.

7. The method according to claim 1, wherein non-precipitation images are identified and eliminated by time series analysis of sequential frames using the following criteria: when images of the same size are detected in the same position in several sequential frame images, they are eliminated as noises, water spots on lens or other non-precipitation images.

8. The method according to claim 1, wherein the raw image of particles are processed in the following steps:
   a. Filter denoising: the noises in raw images are eliminated by median filtering;
   b. Image restoration: the raw images with fuzzy edge are restored using the point spread function and the image degradation model is:

$$g(x,y) = f(x,y) * h(x,y) + n(x,y) \quad (1)$$

where $g(x, y)$ is the blur image, $f(x, y)$ is the ideal image, $n(x, y)$ is the additive noise, $h(i, j)$ is the point spread function, which is defined as:

$$h(i, j) = \begin{cases} 1/(\pi R^2) & \sqrt{i^2 + j^2} \leq R \\ 0 & \sqrt{i^2 + j^2} > R \end{cases} \quad (2)$$

where the R is the defocusing radius, x, y, i, j are the coordinates of pixels in images;
   c. Image binarization and edge detection: the binarization images of particles are obtained by a global threshold value based on the grayscale histogram, and the edges of particles are detected using the binarization threshold.

9. The method according to claim 1, wherein the microphysical characteristics are extracted using the following algorithms:
   a. Area: the summation of pixels with grayscale values that are larger than the threshold:

$$A_R = \sum_{(x,y) \in R} 1 \quad (3)$$

b. Perimeter: the summation of pixel values on the contour of particle's image:

$$P_R = \sum_{(x,y) \in C} 1 \quad (4)$$

c. Long axis: the long axis of minimum enclosing rectangle of particle's image:

$$E_A = \max_{p_i, p_j \in C} \lfloor D(p_i, p_j) \rfloor \quad (5)$$

d. Short axis: the short axis of minimum enclosing rectangle of particle's image:

$$E_B = \max_{p_i, p_j \in C, p_i, p_j \perp E_A} \lfloor D(p_i, p_j) \rfloor \quad (6)$$

e. Equivolumetric diameter: the diameter of spherical particle with the same volume of non-spherical particle:

$$D_{eq} = \left(\frac{6V}{\pi}\right)^{-1/3} = (E_A^2 E_B)^{-1/3} \quad (7)$$

f. Axis ratio: the ratio of short axis and the long axis of particle:

$$\alpha = \frac{E_B}{E_A} \quad (8)$$

g. Canting angle: the angle between the symmetry axis and vertical direction:

$$\theta = \angle \vec{E_B}/\vec{\text{Vertical}} \quad (9)$$

h. Velocities: the moving velocity of particles in horizontal direction and vertical direction:

$$\begin{cases} v_x = \frac{\Delta x}{\Delta t} = \frac{x_2 - x_1}{\Delta t} \\ v_y = \frac{\Delta y}{\Delta t} = \frac{y_2 - y_1}{\Delta t} \end{cases} \quad (10)$$

i. The probability of a certain particle with a certain size and fall velocity being captured by the CCD camera:

$$Prob(D) = \frac{H - D_V - V(D) \cdot T_{interval}}{V(D) \cdot T_{frame}} \quad (11)$$

where H is the height of sampling size, $D_V$ is the vertical size of drops, V (D) is the vertical velocity of drops, $T_{interval}$ is the exposure interval in each frame, $T_{frame}$ is the exposure time of each frame;
   j. The raindrop size distribution N(D):

$$N(D) = \frac{Num(D)}{Vol \cdot dD \cdot Prob(D)} \quad (12)$$

where N(D) is the sampled number concentration of particles per volume per size ($m^{-3}$ $mm^{-1}$); Num(D) is the number of particles of each bin, which can be obtained by counting particles and summing volume increments during the time interval; Vol is the effective sampling volume; dD is the interval size of particle.

10. The method according to claim 6, wherein non-precipitation images are identified and eliminated by time series analysis of sequential frames using the following criteria: when images of the same size are detected in the same position in several sequential frame images, they are eliminated as noises, water spots on lens or other non-precipitation images.

11. The method according to claim 6, wherein the raw image of particles are processed in the following steps:
   a. Filter denoising: the noises in raw images are eliminated by median filtering;
   b. Image restoration: the raw images with fuzzy edge are restored using the point spread function and the image degradation model is:

$$g(x,y) = f(x,y) * h(x,y) + n(x,y) \qquad (1)$$

where g(x, y) is the blur image, f(x, y) is the ideal image, n(x, y) is the additive noise, h(i, j) is the point spread function, which is defined as:

$$h(i, j) = \begin{cases} 1/(\pi R^2) & \sqrt{i^2 + j^2} \leq R \\ 0 & \sqrt{i^2 + j^2} > R \end{cases} \qquad (2)$$

where the R is the defocusing radius, x, y, i, j are the coordinates of pixels in images;
   c. Image binarization and edge detection: the binarization images of particles are obtained by a global threshold value based on the grayscale histogram, and the edges of particles are detected using the binarization threshold.

12. The method according to claim 6, wherein the microphysical characteristics are extracted using the following algorithms:
   a. Area: the summation of pixels with grayscale values that are larger than the threshold:

$$A_R = \sum_{(x,y) \in R} 1 \qquad (3)$$

b. Perimeter: the summation of pixel values on the contour of particle's image:

$$P_R = \sum_{(x,y) \in C} 1 \qquad (4)$$

c. Long axis: the long axis of minimum enclosing rectangle of particle's image:

$$E_A = \max_{p_i, p_j \in C} \lfloor D(p_i, p_j) \rfloor \qquad (5)$$

d. Short axis: the short axis of minimum enclosing rectangle of particle's image:

$$E_B = \max_{p_i, p_j \in C, p_i p_j \perp E_A} \lfloor D(p_i, p_j) \rfloor \qquad (6)$$

e. Equivolumetric diameter: the diameter of spherical particle with the same volume of non-spherical particle:

$$D_{eq} = \left(\frac{6V}{\pi}\right)^{-1/3} = (E_A^2 E_B)^{-1/3} \qquad (7)$$

f. Axis ratio: the ratio of short axis and the long axis of particle:

$$\alpha = \frac{E_B}{E_A} \qquad (8)$$

g. Canting angle: the angle between the symmetry axis and vertical direction:

$$\theta = \angle \vec{E_B} / \overrightarrow{\text{Vertical}} \qquad (9)$$

h. Velocities: the moving velocity of particles in horizontal direction and vertical direction:

$$\begin{cases} v_x = \frac{\Delta x}{\Delta t} = \frac{x_2 - x_1}{\Delta t} \\ v_y = \frac{\Delta y}{\Delta t} = \frac{y_2 - y_1}{\Delta t} \end{cases} \qquad (10)$$

i. The probability of a certain particle with a certain size and fall velocity being captured by the CCD camera:

$$Prob(D) = \frac{H - D_V - V(D) \cdot T_{interval}}{V(D) \cdot T_{frame}} \qquad (11)$$

where H is the height of sampling size, $D_V$ is the vertical size of drops, V(D) is the vertical velocity of drops, $T_{interval}$ is the exposure interval in each frame, $T_{frame}$ is the exposure time of each frame;
   j. The raindrop size distribution N(D):

$$N(D) = \frac{Num(D)}{Vol \cdot dD \cdot Prob(D)} \qquad (12)$$

where N(D) is the sampled number concentration of particles per volume per size ($m^{-3}$ $mm^{-1}$); Num(D) is the number of particles of each bin, which can be obtained by counting particles and summing volume increments during the time interval; Vol is the effective sampling volume; dD is the interval size of particle.

* * * * *